(12) United States Patent  
Ferris et al.

(10) Patent No.: US 8,774,717 B2
(45) Date of Patent: Jul. 8, 2014

(54) PORTABLE AISG CONTROLLER WITH SMARTPHONE INTERFACE AND SYSTEM

(75) Inventors: Matthew D. Ferris, Plano, TX (US); Elmer O. Freeman, Grand Prairie, TX (US); Bobby W. Webb, Allen, TX (US); Holger Raeder, Allen, TX (US)

(73) Assignee: Andrew LLC, Hickory, NC (US)

( * ) Notice: Subject to any disclaimer, the term of this patent is extended or adjusted under 35 U.S.C. 154(b) by 155 days.

(21) Appl. No.: 13/424,190

(22) Filed: Mar. 19, 2012

(65) Prior Publication Data
US 2012/0238211 A1 Sep. 20, 2012

Related U.S. Application Data

(63) Continuation-in-part of application No. 12/905,733, filed on Oct. 15, 2010, now Pat. No. 8,164,520.

(60) Provisional application No. 61/252,082, filed on Oct. 15, 2009.

(51) Int. Cl.
| H04B 7/00 | (2006.01) |
| H04W 88/12 | (2009.01) |
| H04W 88/08 | (2009.01) |
| H04W 24/02 | (2009.01) |
| H01Q 3/00 | (2006.01) |
| H01Q 1/24 | (2006.01) |

(52) U.S. Cl.
CPC .............. *H04W 88/12* (2013.01); *H04W 88/08* (2013.01); *H04W 24/02* (2013.01); *H01Q 3/005* (2013.01); *H01Q 1/246* (2013.01)
USPC .......... 455/41.2; 343/758; 343/766; 342/359; 342/418

(58) Field of Classification Search
CPC ..... H04W 88/08; H04W 88/12; H04W 24/06; H04W 24/02; H01Q 3/005; H01Q 1/246
USPC ................ 455/41.2, 562.1, 67.11, 575.7, 423
See application file for complete search history.

(56) References Cited

U.S. PATENT DOCUMENTS 6,198,925 B1 * 3/2001 Lee ................................ 455/434
6,748,216 B1 * 6/2004 Lee ................................ 455/434

(Continued)

OTHER PUBLICATIONS

International Search Report and Written Opinion regarding PCT/US2010/052926, Oct. 15, 2010.

(Continued)

*Primary Examiner* — Marceau Milord
(74) *Attorney, Agent, or Firm* — Husch Blackwell LLP (57) ABSTRACT

A Master Antenna Controller System is provided. In one example, the Master Antenna Controller System comprises a handheld wireless device and a RET Master. The handheld wireless device may comprise an Android OS or iOS based smartphone or tablet that includes Wi-Fi capabilities communications capabilities. The RET Master may provide full RET control based on the AISG 1.1 and 2.0 standards and communicate with the handheld wireless device via a wireless access point, such as a Wi-Fi server. The combination may be configured to provide extensive, screen-guided, intuitive RET diagnostics functionality. The RET Master itself may also include multiple different pre-defined tests (e.g. test one actuator, test one RET cable, test AISG signal from TMA) and also some standard electrical tests, e.g. measuring voltage, current etc. Additional higher-level functions may be provided on an Application on the handheld wireless device and communicated to the RET Master wirelessly or by USB connection.

9 Claims, 8 Drawing Sheets

(56) References Cited

U.S. PATENT DOCUMENTS

| | | | |
|---|---|---|---|
| 7,286,092 B2 * | 10/2007 | Trejtnar et al. | 343/757 |
| 7,505,010 B2 * | 3/2009 | Franzon et al. | 343/757 |
| 7,978,137 B2 * | 7/2011 | Kalliola et al. | 342/418 |
| 8,027,703 B2 * | 9/2011 | Girard et al. | 455/562.1 |
| 8,085,211 B2 * | 12/2011 | Yang et al. | 343/766 |
| 8,130,161 B2 * | 3/2012 | Arvidsson et al. | 343/757 |
| 8,164,520 B2 * | 4/2012 | Raeder et al. | 342/359 |
| 8,271,018 B2 * | 9/2012 | Sun et al. | 455/524 |
| 8,299,962 B2 * | 10/2012 | Le Sage | 342/359 |
| 2006/0066494 A1 | 3/2006 | Trejtnar et al. | |
| 2006/0229048 A1 | 10/2006 | Carroll et al. | |
| 2007/0229378 A1 | 10/2007 | Clark | |
| 2007/0290935 A1 | 12/2007 | Franzon et al. | |
| 2008/0036670 A1 | 2/2008 | Arvidsson et al. | |
| 2008/0291116 A1 | 11/2008 | Le et al. | |
| 2009/0061941 A1 | 3/2009 | Clark | |
| 2009/0197634 A1 | 8/2009 | Sun et al. | |
| 2010/0201591 A1 | 8/2010 | Girard et al. | |
| 2010/0231450 A1 | 9/2010 | Le Sage | |

OTHER PUBLICATIONS

Wikipedia, "Touchscreen", revision dated Oct. 13, 2008.

* cited by examiner

PORTABLE AISG CONTROLLER WITH SMARTPHONE INTERFACE AND SYSTEM

This patent application claims Priority from U.S. provisional Application No. 61/252,082, with a filing date of 15 Oct. 2009 and U.S. application Ser. No. 12/905,733, with a filing date of Oct. 15, 2010, the disclosures of which are incorporated by reference.

BACKGROUND

Currently many wireless operators use RET (remote electrical tilt) antennas. RET antennas allow wireless operators to remotely control the beam attributes, including, for example, beam direction, of one or more antennas.

Typically, the RET antenna beam attributes are adjusted using motors or actuators according to specifications promulgated by the Antenna Interface Standards Group (AISG). Relevant specifications may be found at http://www.aisg.org.uk (incorporated by reference). While the use of RET antennas has proved advantageous, the setup of such antennas currently requires considerable effort. In order to setup, troubleshoot, and control RET antennas, several different portable controllers may be required. For example, when trouble-shooting RET antenna configurations, crews currently depend on separate electrical measurement and troubleshooting devices which are difficult to use. Additionally crews are often overwhelmed and do not know how to trouble-shoot RET configurations.

When technician crews are on site, wireless operators require the technician crews to provide "close-out-packages" to the wireless operators as a proof of work. A close out package is a key deliverable. Especially during a new installation, preparation of a close out package involves a substantial amount of effort. Currently, technician crews must capture screenshots of controller windows (sometimes with using a camera), manually export selected data, and manually measure and record the location of the antenna with a GPS receiver. Often, the disparate sources of information are manually collected and written to a CD ROM or DVD ROM. Photographs of display screens may be saved in directories on the disks.

SUMMARY

A Master Antenna Controller System is provided herein. In one example, the Master Antenna Controller System comprises a handheld wireless device and a RET Master. The handheld wireless device may comprise an Android OS or iOS based smartphone or tablet that includes Wi-Fi capabilities communications capabilities. The RET Master may provide full RET control based on the AISG 1.1 and 2.0 standards and communicate with the handheld wireless device via a wireless access point, such as a Wi-Fi server. The combination may be configured to provide extensive, screen-guided, intuitive RET diagnostics functionality. The RET diagnostics functionality may include measurements of voltage, current, and AISG protocol commands. The RET Master itself may also include multiple different pre-defined tests (e.g. test one actuator, test one RET cable; test AISG signal from TMA) and also some standard electrical tests, e.g. measuring voltage, current etc. Additional higher-level functions may be provided on an Application on the handheld wireless device and communicated to the RET Master wirelessly or by USB connection. The Application on the handheld wireless device may also guide user about how to test and what steps to do. The Application may also guide the user through several steps for an easy and quick trouble-shooting process.

In one example, an antenna controller system comprises an AISG controller and a handheld wireless device in wireless communication with the AISG controller. The AISG may be a RET controller. The AISG controller comprises a processor, an AISG-compliant interface, coupled to the processor, an AISG diagnostics circuit coupled to the AISG-compliant interface and to the processor, and a wireless access point interface, coupled to the processor. The handheld wireless device may comprise a wireless interface and an application layer. The wireless interface of the handheld wireless device may be wirelessly coupled to the wireless access, point interface of the AISG controller. The processor of the AISG controller may be configured to receive diagnostics information from the AISG diagnostics circuit and provide the diagnostics information to the handheld wireless device via the wireless access point interface. The AISG controller may further be configured to receive control information from the handheld wireless controller via the wireless access point interface and conduct control and configuration functions via the AISG compliant interface in response to the control information. The application layer of the handheld wireless device comprises commands for configuring equipment coupled to an AISG bus.

The Master Antenna Controller System may include a Close-Out-Package Wizard, which will allow technician crews to create standardized close out packages with a few clicks. The Close-Out Package Wizard significantly reduces the time required of the technicians to prepare the close out packages. Also, the wizard provides the standardized the close out package format to ensure same format is used by all technician crews.

The RET Master may be hand-held and battery powered which will allow using that unit on a tower. The handheld wireless device may have a touch-screen for easy handling on site. The handheld wireless device may also have a GPS receiver for easy location measurements. These location measurements may be included in the close out packages. Also, the GPS functionality and different user locations may be employed by the handheld device to perform the functions of an alignment tool for antenna azimuth direction.

DETAILED DESCRIPTION

Figure 1:
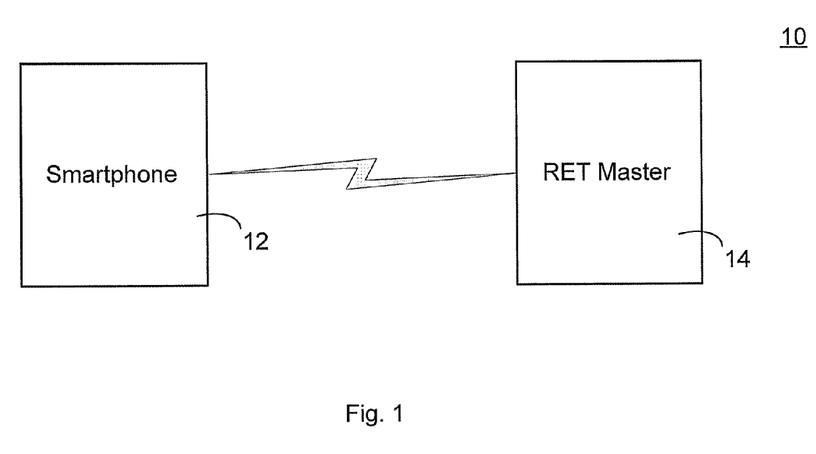
FIG. 1 is a view of a Master Antenna Controller System according to one example of the present invention.

A Master Antenna Controller System 10 according to one example is illustrated in FIG. 1. The Master Antenna Controller System 10 includes a handheld wireless device 12 and a RET Master 14. The Master Antenna Controller System 10 enables a technician to perform initial setup testing, installation configuration, and trouble-shooting diagnostics of all Antenna Line Devices, Remote Electrical Tilt Devices, and Tower Mounted Amplifier.

The RET Master 14 is a hand held AISG-compliant controller. The RET Master 14 is preferably small in size and operable from a battery or a wall plug-in power supply. In one example, the RET Master 14 has a processor and supporting hardware sufficient to operate a basic operating system and effect communications between tower mounted devices and the handheld wireless device 12. Other operating systems suitable for handheld or portable devices may also be used. The RET Master 14 includes enough non-volatile memory storage to hold the operating system footprint, AISG protocol stack, and preferably room for future growth. The handheld wireless device has memory to store antenna configuration files.

Figure 2A:
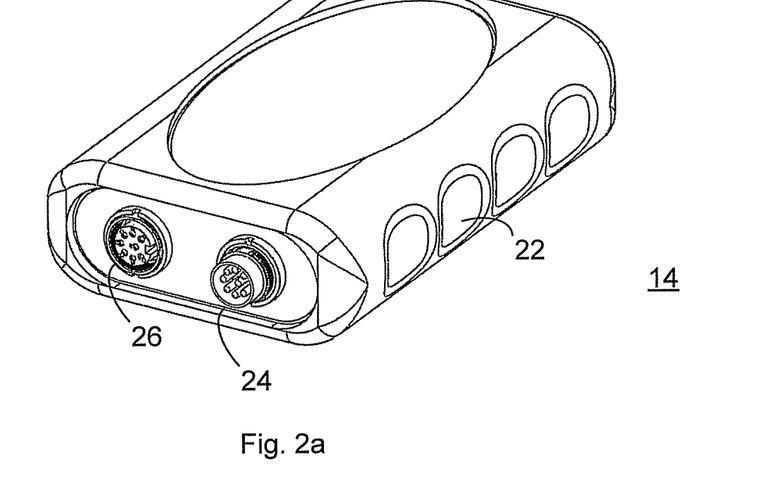
FIG. 2a is an external view of a RET Master according to one example of the present invention.
Figure 2B:
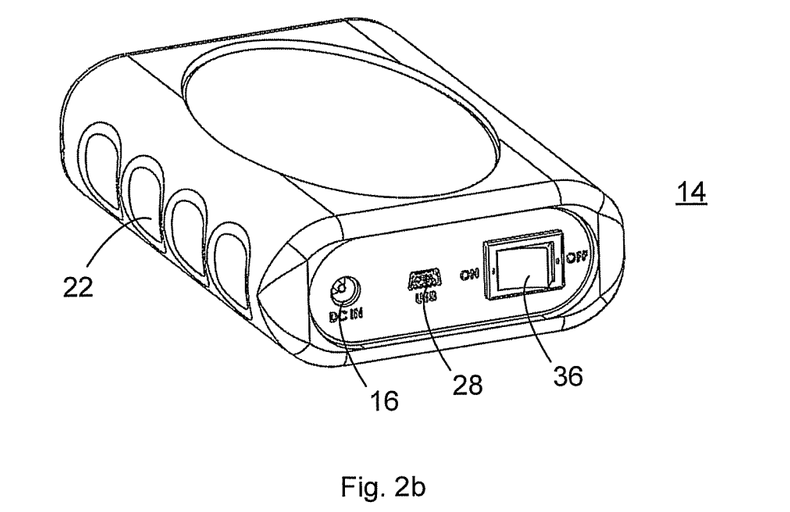
FIG. 2b is an external view of a RET Master according to one example of the present invention.

Exterior views of one example for RET Master 14 are provided in FIG. 2a and FIG. 2b. The RET Master 14 of this example includes a power connector 16 for receiving DC power from an external power source, such as an A/C wall power supply and charger (not shown) and an on-off switch 36. Optionally, a status LED (not shown) may also be included. Grips 22 may be provided for ease of holding the RET Master 14 in use. Male AISG connector 24 and female AISG connector 26 are provided. A USB connector 28 may also be provided.

Figure 3:
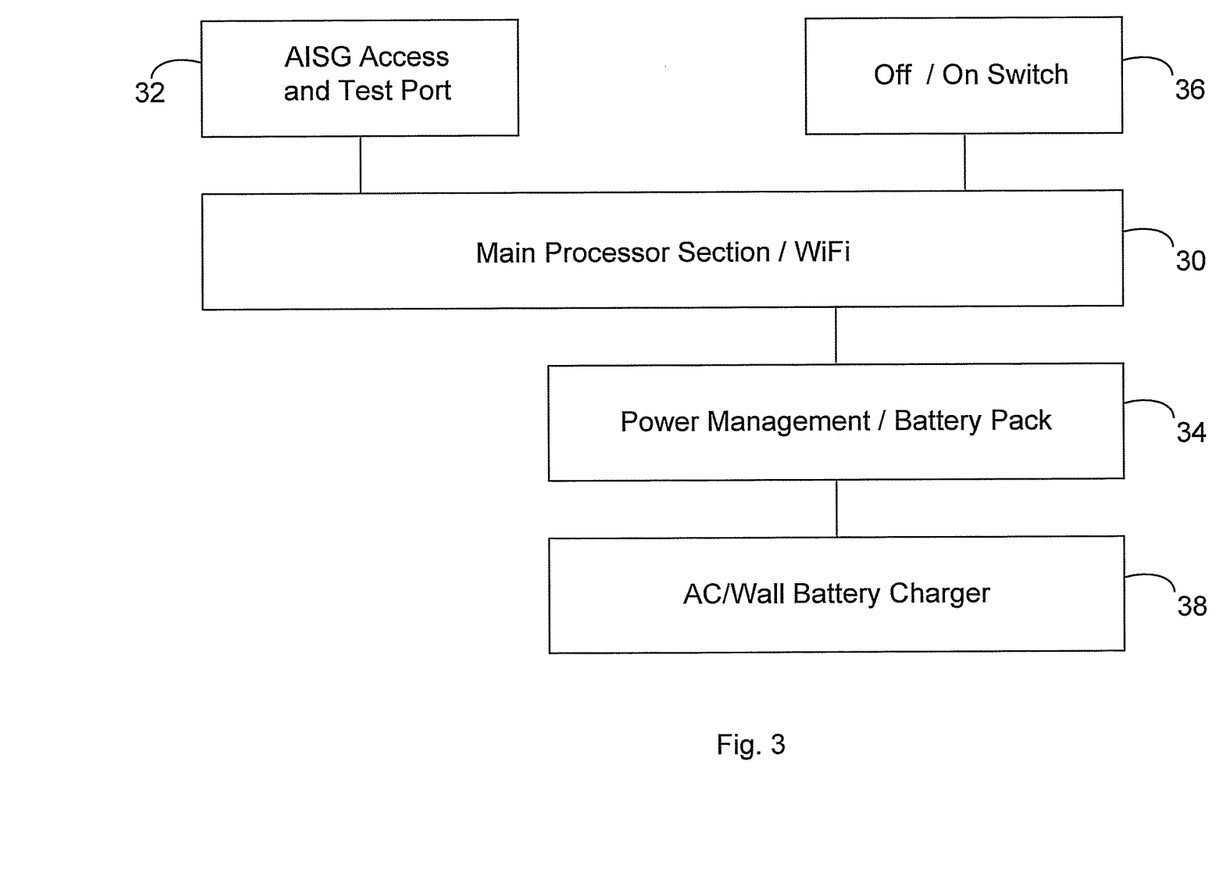
FIG. 3 is a block diagram of a RET Master according to one example of the present invention.

A RET Master 14 may include various hardware blocks. FIG. 3 illustrates one example of how hardware may be arranged in a RET Master 14. In this example, a main processor subsystem 30 is connected to a power management/battery pack 34. The main processor subsystem 30 may be implemented on a circuit board as a complete system on a module. In this example, the main processor subsystem 30 also comprises a Wireless Access Point. Alternatively, a wired USB connection may be provided. The main processor subsystem 30 is capable of receiving communications vial the Wireless Access Point (or USB connection), converting the commands to serial communications suitable for an RS 485 network, and communicating to any AISG 1.0 and 2.0 devices and having the hardware ability to do diagnostic testing on the AISG interface. Alternatively, the main processor section may access an embedded command or test routing upon receipt of a command over the Wireless Access Point. A block diagram of an exemplary main processor board is provided in FIG. 4.

The power management/battery pack 34 may further be connected to a battery charger 38. Any suitable battery pack may be used. In one example, the power management/battery pack 34 may further comprise a NiMH smart battery pack with fuel gauge sub-system. Preferably, the battery pack will incorporate a thermal fuse and a current fuse for protection.

Figure 4:
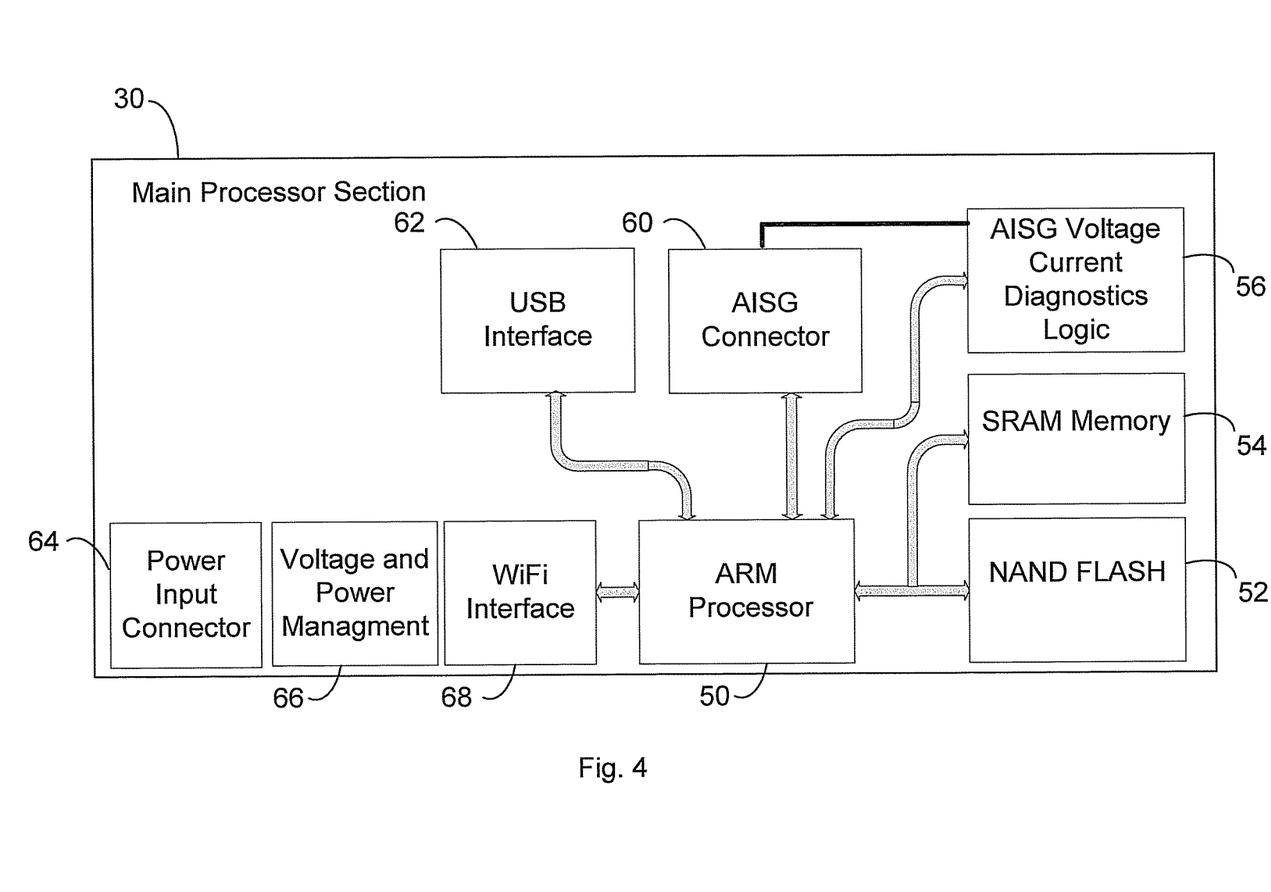
FIG. 4 is a block diagram of one example of a main processor subsystem of a RET Master according to one example of the present invention.

One example of a main processor subsystem 30 is illustrated in FIG. 4. The main processor subsystem 30 of this example includes a processor 50, a storage memory 52, working memory 54, AISG diagnostics logic 56, AISG connector 60, USB connector 62, power input connector 64, voltage and power management 66, and a WiFi communications circuit 68.

The processor 50, in one example, is an ARM-based processor. Because no graphical display, GPS, camera, or graphical user interface is provided on the RET Master 14, the processor may be selected for low cost and low power consumption. For example, a K20P100M microcontroller from Freescale Semiconductor is suitable. The K20P100M has a Cortex M4 core and operates at about 120 MHz.

The storage memory 52 preferably comprises NAND Flash memory. The NAND Flash memory may include a high density 2G-bits, low power, 1.8 Volt memory. This storage memory 52 may be used to store the operating system (if necessary). Additionally, the storage memory 52 may be used to store antenna configuration files and firmware upgrades for tower top RET, TMA and CAD devices.

The working memory 54 may comprise RAM memory. In one example, the main board includes 1Gig-bit of double data rate, low power, 1.8 Volt, 133 MHz, volatile random access memory. This DDR memory is arranged in a 32 Meg×32 bits wide (8 Meg×32-bit×4 banks).

In one example, voltage and power management 66 may comprise an integrated power management IC for applications which require multiple power rails. The power management IC may provide three highly efficient, step-down converters targeted at providing the core voltage, peripheral, I/O, and memory voltage rails in a processor based system. In the RET Master 14 the power management IC provides 1.45V, 1.8V, and the 2.5V voltages to run the main processor subsystem 30. This power management IC manages the low power modes of the processor. The low power modes include Run, Wait, Doze, Retention state, Deep Sleep, and Hibernate modes.

The WiFi communications circuit 68, in this example, may comprise a Wireless Access Point that complies with the IEEE 802.11 family of standards. Preferably, the WiFi communications circuit is configured to limit access and provide encrypted communications, such as with the WEP, WAP, and WAP2 security protocols. The WiFi communication circuit may include router functionality. Alternatively, the WiFi communication circuit may be configured to establish ad hoc connections with one wireless device at a time. In alternative embodiments, other wireless technologies, such as Bluetooth circuitry, may be substituted for the WiFi communications circuit. In another alternative, USB may be used to establish communications between the RET Master 14 and a handheld wireless device 12. In another alternative, a combination of the above technologies may be used.

AISG Connector 60 on the main processor subsystem 30 preferably includes two standard 8-pin, AISG Connectors, male AISG Connector 24 and female AISG Connector 26. The female AISG connector 26 may also be used to output the RS-485 interface from the RET Master 14 per the AISG 1.0 and 2.0 protocol and 24 volts to power a RET/TMA device. The male AISG connector 24 may be used for electrical diagnostics at the physical layer. The male AISG connector 24 interface may be used to check an AISG cable for opens, shorts, and to check to see if there is continuity on the RS-485 signal.

AISG diagnostics logic 56 is provided to help a service technician diagnose problems with any module hooked up to the AISG connector. This circuitry will monitor the voltage and current (power) of the 24 volt supply from the female AISG connector 26. It will also monitor for a short circuit condition on the RS-485 interface. The RET Master 14 may also be configured to reset a RET device by turning off/on the power without needing to physically remove the connector.

In one example, the processor 50, and associated software and memory, is configured to receive AISG commands from the WiFi communications, convert those commands to be compliant with the physical layer of the AISG standards, and communicate those commands on AISG networks attached to the AISG connectors. Communications received on the AISG connectors are formatted for transmission over the WiFi circuit and are transmitted back to the handheld wireless device 12. In this example, the RET Master 14 acts like a modem, where commands and responses pass through the RET Master 14. In another example, certain diagnostic routines and other commands may be embedded in the RET Master 14. For example, the AISG diagnostics logic 56 may include a routine for executing electrical diagnostics at the physical layer, as described above. In this example, a simplified high-level command from the handheld wireless device 12 will be sufficient to initiate a more complex set of communications between the RET Master and devices on the AISG bus, thereby reducing communications loads on the WiFi circuitry and reducing complexity of the Application operating on the handheld wireless device 12.

The main processor section may also include connectors, such as a USB connector, a power input connector 64 and a diagnostic port 72. The diagnostic port 72 may be used for debug purposes used by engineering. The diagnostic port 72 includes RS-232, RS-485, reset, voltages and other nets used for debugging the main processor subsystem 30. Additionally, a JTAG test connector used for software debugging may be provided. Male AISG connector 24 and a female AISG Connector 26 may also be on the main board.

Figure 5:
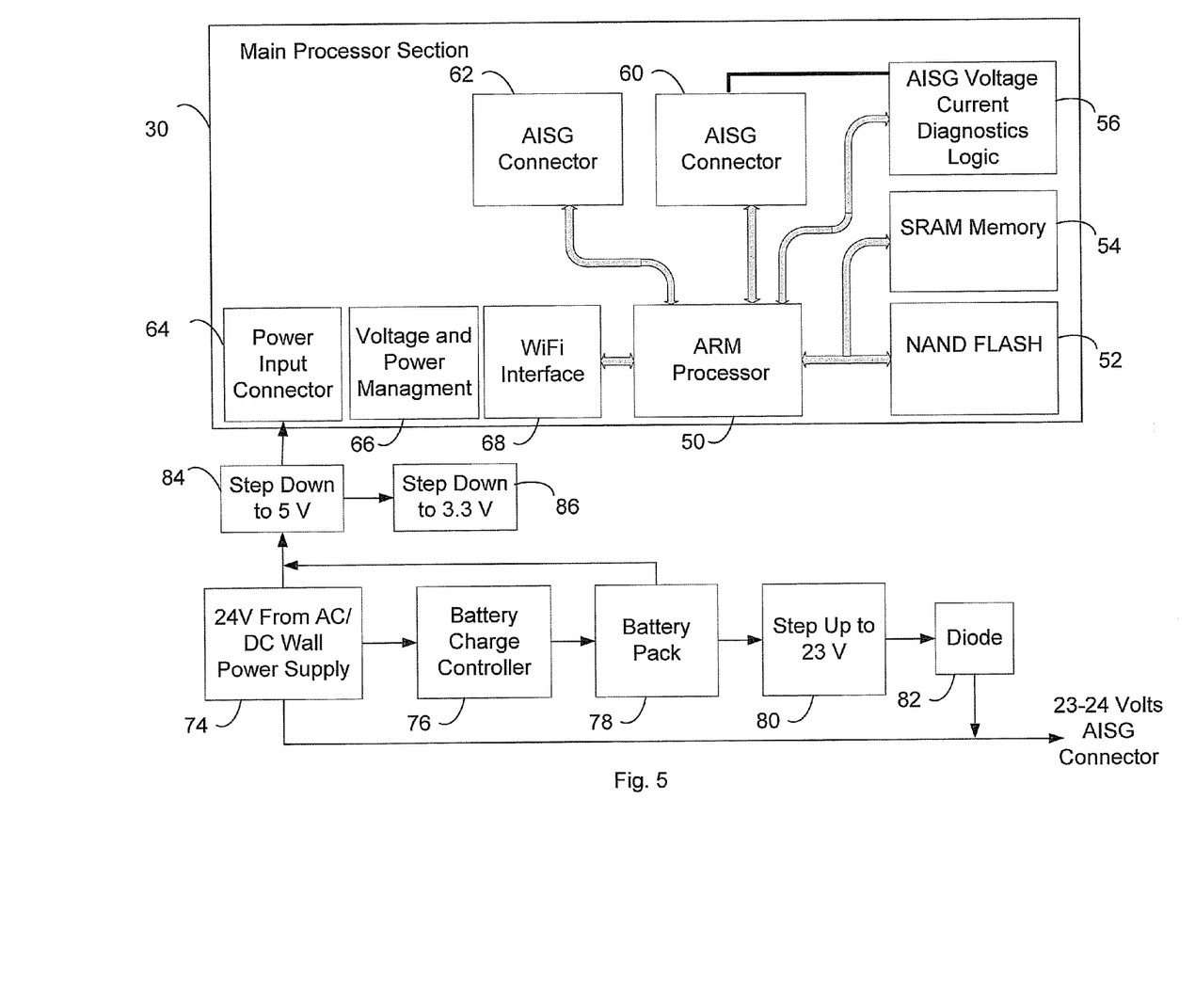
FIG. 5 is a block diagram of an example of a power management arrangement for a Master Antenna Controller according to one example of the present invention.

An alternate embodiment of main processor subsystem 30 is illustrated in FIG. 5. This example includes features of the power management subsystem 34. The processor 50, storage memory 52, working memory 54, AISG diagnostics logic 56 and AISG Connector 60 are largely the same as the embodiment of FIG. 4, and the descriptions of such are incorporated by reference. This example also illustrates additional features of power management, including a 24 Volt input from an AC to DC wall power supply 74, a battery charge controller 76 coupled to the 24 VDC input from wall power supply 74, a battery pack 78, a step up converter 80, and a diode 82. The AISG interface may also be powered directly by the 24 VDC input, if the RET Master 14 is plugged into the wall charger when in use. Also shown is a step down voltage converter 84 to step the voltage down from the battery voltage (or wall charger voltage) to 5 VDC. Also shown is a step down converter 86 to step down from 5 VDC to 3.3 VDC, and a DC to DC converter 88, which provides output voltages of 1.3V, 1.8 V, 2.5 V and 2.8 V from a 5 V input.

The battery charge controller 76 may be coupled to the 24 VDC input. The step up converter 80 may convert the battery voltage to voltage suitable for the AISG interface. The wall power supply may be any suitable supply. In one example, the wall type power supply is an off the shelf, 60 watt, 24 volts DC out power supply.

The RET Master 14 is configured through hardware and software to include the following features\functionality:
  AISG line device communication, testing, and scanning.
  Diagnostic for monitoring voltage and current reading on the AISG line.
  Ability to power off the AISG line without disconnecting the AISG connection.
  AISG protocol for AISG line devices, including AISG messaging.
  Wireless interface for communications with a smartphone/tablet device.

Figure 6:
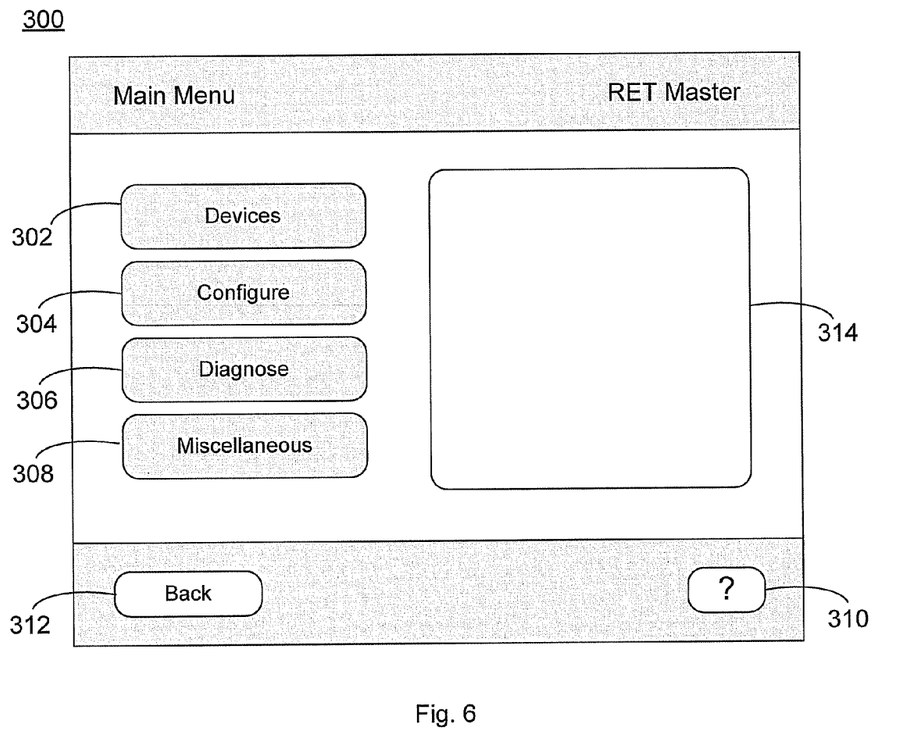
FIG. 6 is an exemplary screen shot of an Application for use with a Master Antenna Controller according to one example of the present invention.

A RET Master Application may be installed to operate on the handheld wireless device 12. The RET Master Application may include a User Interface ("UI") system that will allow the user to navigate between the various components. For example, FIG. 6 illustrates one example of a "main menu" screen shot 300 of the display of the handheld wireless device 12. The main menu provides virtual buttons for selecting activities. The buttons include Devices 302, Configure 304, Diagnose 306 and Miscellaneous 308. Also included are buttons for help ("?") 310 and Back 312. An image area 314 may be used to display an image, such as a photograph of the installation being serviced.

Figure 7:
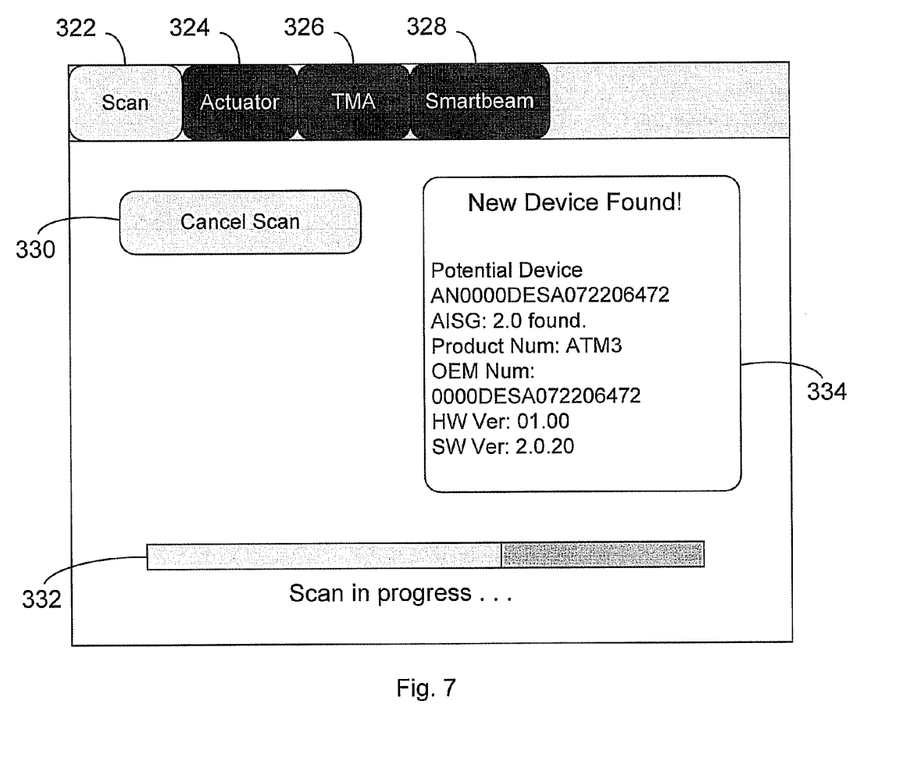
FIG. 7 is another exemplary screen shot of an Application for use with a Master Antenna Controller according to one example of the present invention.
Figure 8:
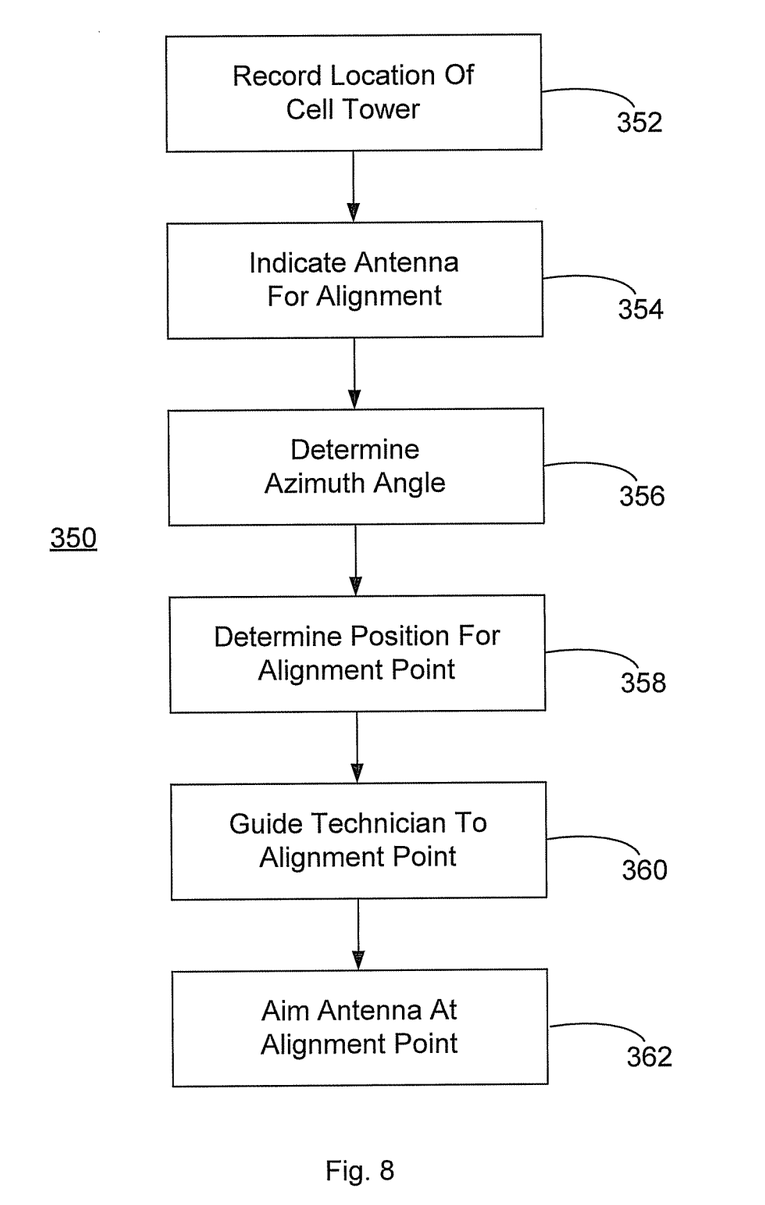
FIG. 8 is a flow chart of one example of a method of aligning an antenna using a Master Antenna Controller according to one example of the invention.

FIG. 7 illustrates one example of a scan process screen 320. Scan process screen 320 includes virtual buttons for Scan 322, Actuator 324, TMA 326, and Smartbeam 328. The scan process screen 320 also includes a Cancel Scan 330 button and a scan progress bar 332. Information window 334 displays information regarding the devices found during the scan.

The RET Master Application is also responsible for providing access to features of the handheld wireless device 12, such as a digital camera, a GPS, a MEMS accelerometer, and, a fluxgate magnetic compass.

In use, one function of the Master Antenna Controller System 10 is to control RET antennas. Typically, the RET Master 14 is connected to a bus via the AISG connectors 24 and/or 26. The RET Master 14 also activates the WiFi communications circuit 68. The handheld wireless device 12 establishes a connection with the RET Master 14 via the WiFi communications circuit 68.

The RET Master Application presents graphical representations of antenna control commands via the user interface and receives selected commands in the user interface. In one example, as illustrated in FIG. 11, the RET Master Application is configured to display a screen from which a user may select a "scan" button. When the "scan" button is selected, the RET Master Application communicates commands to the RET Master 14 to imitate a scan process. The RET Master 14 opens scan communication onto the bus. When an actuator is found, additional information is queried on the device. Information concerning the located devices is communicated from the RET Master 14 to the RET Master Application on the handheld wireless device 12. The RET Master Application registers the device onto its device list and propagates the information to the UI thread. The User Interface system updates the device UI list with the newly added device. As illustrated in FIG. 7, the information may be displayed in information window 334. The RET Master Application may be configured to periodically update the scan.

The Master Antenna Controller System 10 may also be configured to control non-AISG actuators. In this example, a user may select a non-configured actuator on the RET Master Application. The user selects the button "Edit Selected" which will bring up the "Edit Selected" dialog for the actuator. The user may then select an antenna model from an Antenna Model selection menu. The user selects a "Commit" button. RET Master Application looks up the information for the selected antenna model and configures the selected actuator. The RET Master Application then updates the "model" UI element with the configure antenna model for the actuator.

To activate a tilt actuator, in one example, from the device screen, the user selects the actuator to tilt. The user clicks on the "Move Selected" button. The RET Master Application launches the "Move Selected" form. The user provides a tilt value in the tilt UI element. The user clicks on the "Commit"

button. The RET Master Application disables all UI-enabled elements on the "Move Selected" form. The RET Master Application sends the command to tilt the actuator. The RET Master Application updates the current tilt value for the actuator. The RET Master Application enables the UI-enabled elements on the "Move Selected" form. Other movements of the RET antenna (e.g., Pan) may be controlled in a similar manner.

The handheld wireless device 12 may also be used according to alignment process 350, illustrated in FIG. 12. A first technician may record a location of a cellular antenna tower (step 352) using the GPS functionality of the handheld wireless device 12. Through inputs made via the touch screen or other input means on the handheld wireless device 12, the technician may then indicate which of the antennas on the tower requires alignment (step 354). The RET Master Application then determines the desired azimuth angle (step 356) for the selected antenna from information provided by the wireless operator. Alternatively, the step of determining the described azimuth angle (step 356) may be performed by the technician who may then enter a desired azimuth angle. The RET Master Application then determines a location for the technician to position him or herself to serve as an alignment point (step 358). The alignment point is chosen such that, when the selected antenna is aimed at the alignment point, the desired azimuth angle is achieved. The RET Master Application then guides the technician to the alignment point (step 360). In one example, the RET Master Application may display a heading to walk (graphically, with an arrow if so desired) and a distance to walk from the tower base. The RET Master Application receives updated location information from the GPS as the technician moves toward the alignment point. In one example, when the first technician holding the RET Master Application has reached the alignment point, the RET Master Application indicates to the first technician to stop. In the final step, a second technician on the tower may align the antenna by pointing the antenna at the first technician standing at the alignment point (step 362). This technique avoids the known disadvantages of tower-induced magnetic compass deviation and hauling cumbersome, expensive alignment tools aloft.

The RET Master Application may include a Close-Out-Package Wizard, which will allow technician crews to create standardized close out packages with a few clicks. The close-out package is a predefined report documenting that the antennas in an associated cell tower are installed and operating according to the requirements of a wireless operator. The Close-Out Package Wizard significantly reduces the time required of the technicians to prepare the close out packages. Also, the wizard provides a standardized the close out package format to ensure same format is used by all technician crews.

The close out package may include the following information: latitude/longitude coordinates of the site, as provided by GPS circuitry on the handheld wireless device, electrical diagnostic information obtained by the RET Master 14 and communicated to the handheld wireless device 12; antenna/antenna controller configuration information; site photographs, as taken by a digital camera that is resident on the handheld wireless device 12; images of bar codes of equipment installed at the site, obtained using the digital camera resident on the handheld wireless device 12, antenna azimuth orientation, as obtained from a compass resident on the handheld wireless device 12, mechanical alignment of an antenna, such as mechanical pre-tilt, as obtained from a MEMS accelerometer resident on the handheld wireless device 12, installation instructions and requirements, as may be presented to a field technician on the on the handheld wireless device 12, notes and observations by field technicians, as may be entered on the handheld wireless device 12 by way of a virtual keyboard, voice recording, voice recognition, or other suitable technology, and other information that may be collected via the RET Master or sensors on the handheld wireless device 12.

What is claimed is:

1. An antenna controller system comprising:
    an AISG controller; and
    a handheld wireless device in wireless communication with the AISG controller,
    the AISG controller comprising:
    a processor;
    an AISG-compliant interface, coupled to the processor;
    an AISG diagnostics circuit coupled to the AISG-compliant interface and to the processor; and
    a wireless access point interface, coupled to the processor;
    the handheld wireless device comprising a wireless interface and an application layer; wherein the wireless interface of the handheld wireless device is wirelessly coupled to the wireless access point interface of the AISG controller;
    wherein the processor is configured to receive diagnostics information from the AISG diagnostics circuit and provide the diagnostics information to the handheld wireless device via the wireless access point interface, and is further configured to receive control information from the handheld wireless device via the wireless access point interface and conduct control and configuration functions via the AISG compliant interface in response to the control information; and
    wherein the application layer of the handheld wireless device comprises commands for configuring equipment coupled to an AISG bus.

2. The antenna controller system of claim 1, wherein the wireless access point interface comprises a WiFi communications circuit.

3. The antenna controller system of claim 1, wherein the wireless access point interface comprises a Bluetooth communications circuit.

4. The antenna controller system of claim 1, wherein the AISG-compliant interface and the AISG diagnostics circuit are configured to check for continuity on an AISG bus.

5. The antenna controller system of claim 1, wherein the AISG-compliant interface and the AISG diagnostics circuit are configured to perform electrical diagnostics at the physical layer.

6. The antenna controller system of claim 1, wherein the application layer is configured to communicate scan commands to the AISG controller via the wireless interface.

7. The antenna control system of claim 1, wherein the handheld wireless device further comprises an accelerometer.

8. The antenna control system of claim 1, wherein the application layer of the handheld wireless device is configured to provide a close out package, the close out package including diagnostic information from the AISG controller, configuration information relating to devices on an AISG bus, and information derived from at least one sensor on the handheld wireless device.

9. The antenna control system of claim 1, wherein the information derived from sensors on the handheld wireless device includes at least one of: location information, image information, antenna mechanical tilt information, and antenna azimuth alignment information.

* * * * *